Feb. 3, 1970  N. W. W. PORTER  3,493,469
DISTILLATION AND DECANTING SYSTEM FOR SEPARATING COMPONENTS
Filed March 6, 1967
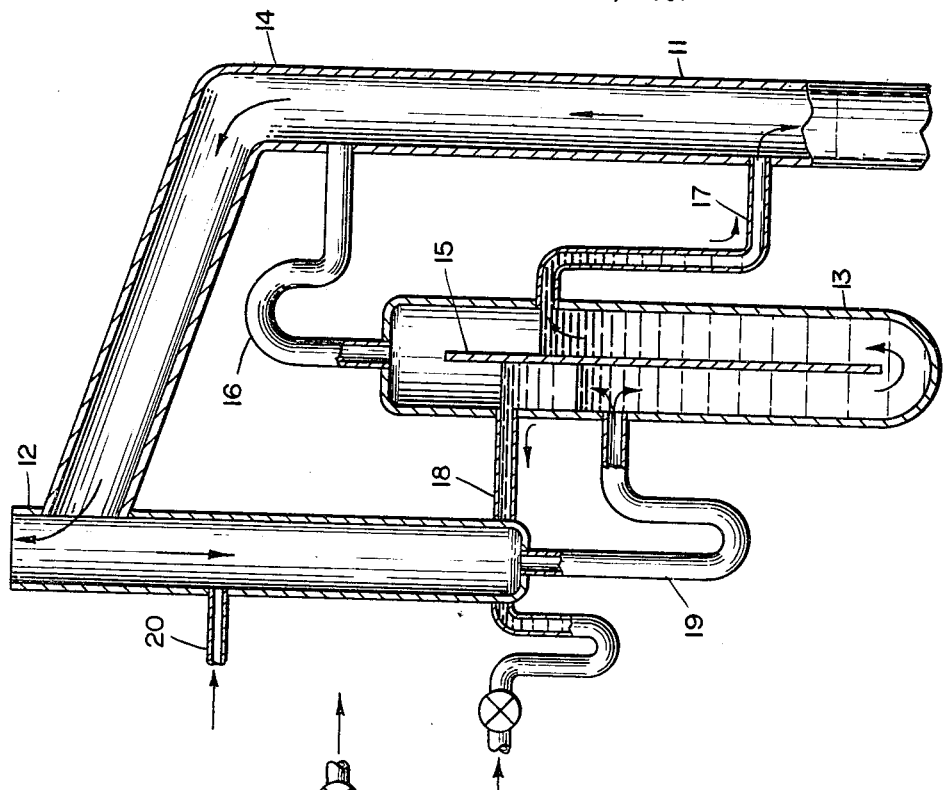
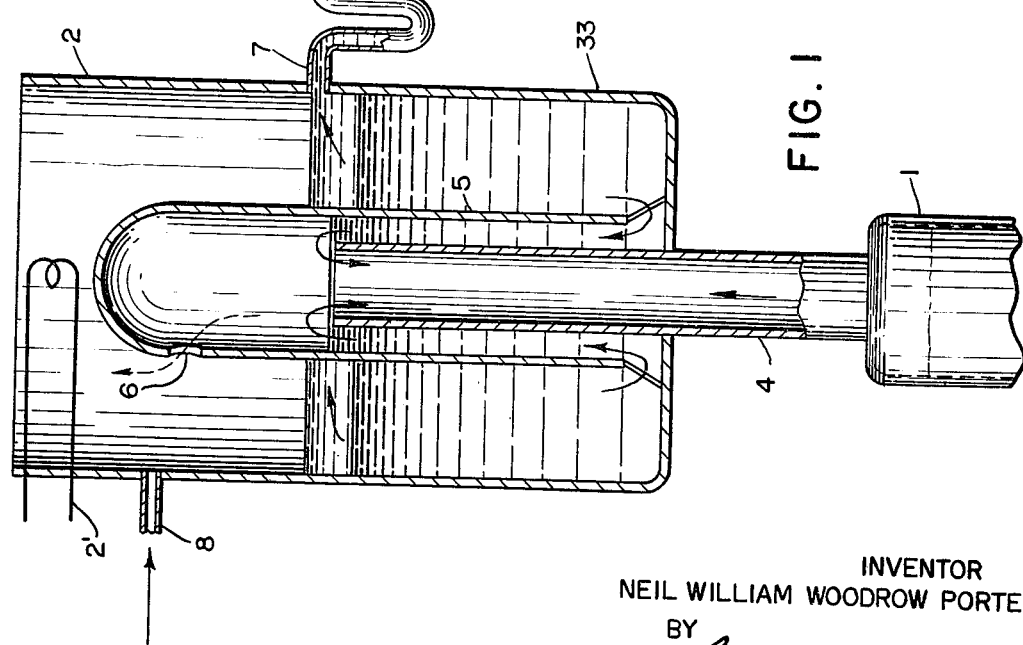
INVENTOR
NEIL WILLIAM WOODROW PORTER
BY
Richard P. Crowley
ATTORNEY

United States Patent Office 3,493,469
Patented Feb. 3, 1970

3,493,469
DISTILLATION AND DECANTING SYSTEM FOR SEPARATING COMPONENTS
Neil William Woodrow Porter, Loughborough, England, assignor to Fisons Industrial Chemicals Limited, Loughborough, England
Filed Mar. 6, 1967, Ser. No. 620,845
Claims priority, application Great Britain, Mar. 12, 1966, 10,983/66
Int. Cl. B01d 3/00; F28b 9/08
U.S. Cl. 202—176                8 Claims

ABSTRACT OF THE DISCLOSURE

This invention is concerned with a distillation technique for separating the components of mixtures resulting from the synthesis of azines from for example bleach, ammonia and carbonyl compounds. The distillation column used for the separation incorporates a decanting device.

---

A process for separating by distillation the products obtained in the formation of azines from, for example, bleach, ammonia and carbonyl compounds.

BACKGROUND OF THE INVENTION

The present invention relates to a process and apparatus for separating mixture containing water, sodium chloride, ammonia, ketone condensation products, a carbonyl compound and the azine derived from the carbonyl compound.

Mixtures of the type described above are met with in various processes associated with the manufacture of hydrazine such as the reaction between bleach and ammonia in the presence of a ketone to form an azine from which hydrazine can be made as described for example in U.S. Patent No. 2,993,758, hereby incorporated by reference. It has now been found that the products of such reactions can be separated by fractional distillation without significant loss of the azine by hydrolysis.

SUMMARY OF THE INVENTION

Accordingly the present invention is for a process for effecting separation of one or more of the components of a mixture containing a carbonyl compound, the azine and/or hydrazone of the carbonyl compound, ammonia, sodium chloride, ketone condensation products and water which comprises fractionating the mixture whereby the non-volatile components of the mixture are removed as bottoms and the volatile components are rectified, ammonia being obtained as distillate and a two-phase liquid mixture being obtained as condensate, the lighter of the two phases containing azine and/or hydrazone and carbonyl compound and the heavier of the two phases containing a solution of azine and/or hydrazone and carbonyl compound in water separating the lighter phase from the heavier phase, recovering the lighter phase and fractionating the heavier phase.

The present invention also provides an apparatus for effecting separation of one or more of the components of mixtures containing a carbonyl compound, the azine and/or hydrazone of the carbonyl compound, ammonia, sodium chloride, ketone condensation products and water which comprises a fractionating column, a reflux condenser, and a separator unit, the separator unit comprising a first zone, connecting means between the first zone and the reflux condenser through which condensed vapours pass from the condenser into the first zone where they separate into two liquid phases, a second zone, a connecting means between the first zone and the second zone located at a point below the interface of the two phases, an overflow means located in the second zone connected to the fractionating column whereby the lower of the two phases overflow back into the fractionating column and an off-take line from the first zone so located as to allow removal of the upper phase and a connecting means between the fractionating column and the condenser through which vapours pass from the fractionating column to the condenser.

The mixture to be worked up may be introduced into the apparatus above, below or into the liquid-liquid separator or into the fractionating column or above the reflux condenser.

The fractionating column should have at least five theoretical plates below the feed-point in order to prevent ammonia and carbonyl compound entering the still.

The present invention is particularly applicable to the separation of the mixtures described above when the ketone is methyl ethyl ketone and the azine is ethyl ketazine.

When a mixture containing water, sodium chloride, ammonia, a ketone and the azine derived from that ketone is fed into the apparatus at any of the points described above, the water and sodium chloride pass into the still, the majority of the azine and the ketone pass out through the decanting system and the ammonia, with a small amount of the ketone and a trace of azine pass through the reflux condenser. The latter mixture may then be collected by any of the usual means of ammonia recovery, such as absorption in water, liquefaction or re-used directly as the gas.

The proportions of ketone and azine passing over with the ammonia gas depend on the temperature of the ammonia gas leaving the apparatus. By reducing the temperature of the gas leaving the apparatus the proportions of ketone and azine passing over are reduced. Alternatively a section of packed column may be fitted above and/or below the condenser and the ketone and azine absorbed by passing water or aqueous ammonia down this packed section. The water and ammonia plus absorbed ketone, and azine will then pass from the upper packed column into the separator and thence to the fractionating column where the ammonia, ketone and azine will be stripped from it.

It is sometimes found that traces of hydrazine or a hydrazone (which may be formed by complete or partial hydrolysis of the azine which is being processed) pass into the boiler.

By feeding a suitable quantity of the ketone to the lower part of the fractionating column these compounds may be converted to the more volatile azine which will pass up the fractionating column and thus be removed by the separation unit.

In operating the apparatus the temperature of the vapours during fractionation is preferably maintained in the range 40° C. to 90° C. The lighter phase is preferably separated from the heavier phase at an elevated temperature but below the boiling point of either phase. The apparatus will normally be operated under atmospheric pressure but it may be operated under increased pressure or reduced pressure if desired.

BRIEF DESCRIPTION OF THE DRAWINGS

The apparatus used in the present invention is illustrated in the accompanying drawings in which FIGURE 1 and FIGURE 2 are diagrams of separator units showing connections with a fractionating column and a condenser.

DESCRIPTION OF THE PREFERRED EMBODIMENTS

Referring to FIGURE 1 there is illustrated a separator or decanter unit connecting a fractionating column 1 and a condenser 2 having cooling coil 2'. The separator unit is made up of a separator column 3 connected to condenser 2, a tube 4 connected to the fractionating column 1 and a cylindrical baffle 5 arranged around the tube 4. The cylindrical baffle is provided with a side vent 6. An offtake line 7 and a feed line 8 are provided in separator 3. A fractionating column may be provided between condenser 2 and separator 3.

In operation the azine mixture is distilled through column 1 the vapours passing through tube 4 and its vent 6 into condenser 2. Condensed vapours and material fed in through line 8 form a two phase mixture in separator 3. The lighter phase floats on the denser phase which flows beneath baffle 5 eventually overflowing into tube 4. The lighter phase is withdrawn through offtake line 7. It is thus apparent that the lighter phase, azine, can be recovered.

Referring to FIGURE 2 of the drawing there is illustrated an alternative method of operation. In this figure fractionating column 13 has an internal baffle 15 which divides column 13 into two sections which are connected at the top and bottom of the column 13. One of these sections is connected by tube 17 to fractionating column 11 while the other section is provided with an offtake line 18 and a line 19 which is connected to condenser 12. A feed line 20 connects with line 19. A fractionating column may be provided between condenser 12 and tube 14.

In operation the azine mixture is distilled from the fractionating column and passes through tube 14 into condenser 12. Condensed vapours and feed material from line 20 pass into separator 13 through line 19 where two phases separate. The heavier phase passes underneath baffle 15 and eventually overflows through line 17 to return to distillation column 11. The lighter phase is taken off and recovered through line 18.

The following examples, in which parts are by weight, are given to illustrate the present invention.

Example 1

A mixture comprising 546 parts of water, 47 parts of sodium chloride, 182 parts of ammonia, 25 parts of methyl ethyl ketone, 49 parts of methyl ethyl ketazine and a small amount of ketone condensation products was fed into the apparatus illustrated in FIGURE 1 every hour.

The mixture was fed in between the reflux condenser and the separator and the temperature of the vapours entering the reflux condenser was 49° C. The temperature of the gases leaving the apparatus was 20° C.

Hourly recoveries were:
 (a) From the decanter 47 parts of methyl ethyl ketazine and 10 parts of methyl ethyl ketone.
 (b) From the uncondensed gases 1 part of methyl ethyl ketazine, 14 parts of methyl ethyl ketone and 180 parts of ammonia.
 (c) From the boiler hydrazine equivalent to 0.5 part of methyl ethyl ketazine.

Example 2

The feed rates and apparatus were as described in Example 1 but the temperature of the gases leaving the apparatus was −10° C.

Hourly recoveries were:
 (a) From the decanter 48.5 parts of methyl ethyl ketazine and 25 parts of methyl ethyl ketone.
 (b) From the uncondensed gases 180 parts of ammonia. Only a trace of methyl ethyl ketone was detected.
 (c) From the boiler methyl ethyl hydrazine and/or hydrazine equivalent to 0.5 part of methyl ethyl ketazine.

I claim:
1. An apparatus for effecting separation of one or more of the components of mixtures containing a carbonyl compound, the azine and hydrazone of the carbonyl compound, ammonia, sodium chloride, ketone condensation products and water which comprises in combination:
 feed means for introducing said mixture into the apparatus,
 a fractionating column,
 a condenser adapted to receive vapors from the fractionating column and adapted to permit the passage of ammonia but which condenses the remainder of the vapors, and
 a separator unit, the separator unit being composed of a first and second zone,
 the first zone adapted to receive the condensed vapor from said condenser wherein said condensed vapor separates into two liquid phases,
 connecting means between the first and second zone located at a point beneath the interface of said two liquid phases,
 overflow means located in the second zone whereby the lower of the two phases passes into the fractionating column, and
 means for removing and collecting the upper phase of said two phases from said first zone.

2. An apparatus as defined in claim 1 wherein the overflow means is located below the means for removing the upper phase.

3. An apparatus as defined in claim 1 wherein the fractionating column has at least five theoretical plates.

4. An apparatus as defined in claim 1 wherein a fractionating column is provided between the reflux condenser and the separator unit.

5. An apparatus as defined in claim 1 wherein said fractionating column includes a baffle dividing said column into two sections which are connected at opposite ends of said baffle; one of said sections containing means for withdrawing one of said liquid phases; the other of said sections containing means for withdrawing the other of said phases.

6. An apparatus as defined in claim 1 wherein said feed means is located above the separator unit.

7. An apparatus as defined in claim 1 wherein said feed means are located adjacent the separator unit.

8. An apparatus as defined in claim 1 which includes a packed column associated with said fractionating column.

References Cited

UNITED STATES PATENTS

| | | | |
|---|---|---|---|
| 2,993,758 | 7/1961 | Abendroth et al. | 23—190 |
| 1,498,350 | 6/1924 | Christie | 202—126 |
| 1,468,899 | 9/1923 | Chenard | 202—199 |
| 2,803,524 | 8/1957 | Deutschman et al. | 23—190 |
| 2,878,103 | 3/1959 | Robell et al. | 23—190 |
| 2,955,921 | 10/1960 | Henrich | 23—190 |
| 3,028,316 | 4/1962 | Rahlfs et al. | 203—62 |
| 3,034,861 | 5/1962 | Pursley | 23—190 |
| 3,098,017 | 7/1963 | Walter et al. | 203—14 |
| 3,301,770 | 1/1967 | Di Cio et al. | 203—62 X |
| 3,309,295 | 3/1967 | Cahn et al. | 202—176 X |
| 3,244,600 | 4/1966 | Sinex | 202—199 X |

FOREIGN PATENTS 535,270  1/1957  Canada.

NORMAN YUDKOFF, Primary Examiner

F. E. DRUMMOND, Assistant Examiner

U.S. Cl. X.R.

202—204, 187; 203—39